No. 759,424.

Patented May 10, 1904.

UNITED STATES PATENT OFFICE.

ASAHEL K. EATON, OF NEW YORK, N. Y., ASSIGNOR OF ONE-HALF TO HUGH M. EATON, OF NEW YORK, N. Y.

METHOD OF MAKING METALLIC CHROMIUM.

SPECIFICATION forming part of Letters Patent No. 759,424, dated May 10, 1904.

Application filed October 3, 1903. Serial No. 175,624. (No specimens.)

*To all whom it may concern:*

Be it known that I, ASAHEL K. EATON, a citizen of the United States, residing at New York, borough of Brooklyn, county of Kings, and State of New York, have invented certain new and useful Improvements in Methods of Making Metallic Chromium, of which the following is a specification.

My present invention relates to the production of substantially pure chromium, more particularly from certain chromites discovered by me and described in my prior patent, No. 422,509, issued to myself and another March 4, 1890. Of these chromites I prefer to use the chromite of zinc as the basis of the present process, chiefly on the ground of economy in cost, though other chromites—such as, for example, that of cadmium—may be used, if desired. In the prior patent referred to above, I describe the production of zinc chromite by a process wherein zinc sulfate and potassium bichromate are used; but of course other salts of zinc, as the chlorid, may be employed, as well as other bichromates, such as the bichromate of sodium. The latter salt being less costly than the corresponding and equivalent potassium compound will generally be used. The sodium salt is also preferable for another reason—namely, that with equal masses the sodium salt will yield a larger amount of chromium—or, stated otherwise, to produce fifty-two pounds of chromium there is required 147.6 pounds of potassium bichromate, while the same amount will be produced with only 131.6 pounds of the sodium salt.

Taking 131.6 pounds of sodium bichromate ($NaO,2CrO_3$) and 143.2 pounds of zinc sulfate ($CnO,SO_3 + 7HO$) as convenient quantities the two are thoroughly mixed and subjected to a red heat. During the heating the sulfuric acid of the zinc sulfate combines with the sodium of the bichromate, forming an equivalent of sodium sulfate. The two equivalents of chromic acid are broken up by the escape of three equivalents of oxygen, converting the chromic acid into chromous acid or sesquioxid of chromium, ($Cr_2O_3$,) which combines with the zinc oxid and forms chromite of zinc, ($ZnOCr_2O_3$.) With the amount of bichromate mentioned above there will also be liberated twenty-four pounds of oxygen, over three hundred cubic feet, which of course may be readily collected and utilized.

The solid products of the process are zinc chromite 116.6 pounds and sodium sulfate 71.2 pounds. The latter is easily removed by washing with water, from which the dissolved salt may be readily recovered, if desired, by evaporation and crystallization. The chromite of zinc thus produced is a gray powder, which may be completely reduced by the following treatment: The chromite is mixed with a suitable reducing agent, preferably 20.5 per cent. of its weight of powdered carbon, moistened slightly with water containing a little molasses, sugar, or other suitable binder, and the resulting mass is formed into very solid compact cakes by heavy pressure, as by means of a hydraulic press. The reducing-carbon may be ordinary charcoal; but animal charcoal is preferable, such as that made from horn, hoof, or rawhide clippings. The clippings are burned to a crisp, powdered and mixed with about two per cent. of potassium carbonate, then combined with the chromite, as above described.

The cakes of chromite and carbon are now placed in a suitable crucible or furnace and heated until the zinc is thoroughly volatilized. At the same time the carbon or other reducing agent combines with the oxygen of the chromite, leaving pure chromium in lumps or masses of greater or less size, according to the size of the cakes used.

The compression of the mixed chromite and carbon into cakes is a very important feature of the process. The finely-divided carbon is thereby brought into close contact with the powdered chromite and the chemical reactions are accordingly aided, and the zinc is entirely volatilized by the heat of the furnace, and so got rid of without recourse to acids.

By the above process it is possible to produce metallic chromium very cheaply for the manifold uses to which it can be put. As one of the most valuable uses of chromium is in steel making, the manufacturer can now use the pure metal instead of the impure ferrochrome heretofore employed.

The steps described above are those which

I prefer to use in practicing my invention; but it should be understood, of course, that the same is capable of considerable variation without departure from its proper scope.

What I claim is—

1. The method of producing chromium, which consists in mixing a reducing agent with the chromite of a readily-volatilizable base, and subjecting the mixture to heat, whereby the chromium is reduced to metallic form, as set forth.

2. The method of producing chromium, which consists in mixing powdered carbon with a chromite of a readily-volatilizable base, and subjecting the mixture to heat, as set forth.

3. The method of producing chromium, which consists in mixing powdered carbon with a suitable binder and a chromite of a readily-volatilizable base, compressing the mixture into cakes, and subjecting the latter to heat, as set forth.

4. The method of producing chromium, which consists in mixing powdered carbon with a suitable binder and powdered chromite of zinc, compressing the mixture into cakes, and subjecting the latter to heat, as set forth.

5. The method of producing chromium, which consists in mixing powdered animal charcoal with a suitable binder and chromite of zinc, compressing the mixture into solid cakes by heavy pressure, and subjecting the cakes to heat, whereby the zinc is volatilized and the chromous acid reduced, as set forth.

ASAHEL K. EATON.

Witnesses:
D. H. COCHRAN,
M. LAWSON DYER.